(12) United States Patent
Rasdon

(10) Patent No.: US 12,352,387 B2
(45) Date of Patent: Jul. 8, 2025

(54) BEARING GREASING ASSEMBLY

(71) Applicant: Danny Rasdon, Weiner, AR (US)

(72) Inventor: Danny Rasdon, Weiner, AR (US)

( * ) Notice: Subject to any disclaimer, the term of this patent is extended or adjusted under 35 U.S.C. 154(b) by 292 days.

(21) Appl. No.: 18/133,581

(22) Filed: Apr. 12, 2023

(65) Prior Publication Data

US 2024/0344657 A1 Oct. 17, 2024

(51) Int. Cl.
*F16N 3/12* (2006.01)
*A01B 33/08* (2006.01)

(52) U.S. Cl.
CPC ............... *F16N 3/12* (2013.01); *A01B 33/08* (2013.01); *F16N 2210/00* (2013.01)

(58) Field of Classification Search
CPC ...... F16N 7/385; F16N 2210/14; F16N 29/02; F16N 3/12; F16N 2210/00; A01B 71/04
See application file for complete search history.

(56) References Cited

U.S. PATENT DOCUMENTS

| | | | | | |
|---|---|---|---|---|---|
| 1,428,547 | A | * | 9/1922 | Klaserner | B60R 17/02 184/26 |
| 1,576,822 | A | * | 3/1926 | Hayden | F16N 3/12 184/105.3 |
| 1,732,579 | A | * | 10/1929 | Gleason | B60R 17/02 138/40 |
| 1,811,343 | A | * | 6/1931 | Bancroft | F16N 25/00 138/28 |
| 1,955,161 | A | * | 4/1934 | Zerk | F16N 13/16 184/29 |
| 2,012,923 | A | * | 8/1935 | Bystricky | F16N 3/12 222/262 |
| 2,039,511 | A | * | 5/1936 | Bailey | F16N 13/22 184/81 |
| 2,134,697 | A | * | 11/1938 | Bijur | B60R 17/02 184/82 |
| 2,425,515 | A | * | 8/1947 | Davis | F16N 27/005 184/7.4 |
| 2,545,319 | A | * | 3/1951 | Sundholm | F16N 5/00 222/340 |
| 2,626,016 | A | * | 1/1953 | Kiefer | B65G 45/08 184/81 |
| 2,772,029 | A | * | 11/1956 | De Lucia | B60R 17/00 141/102 |
| 3,326,323 | A | * | 6/1967 | Delker | F16D 3/40 184/26 |

(Continued)

FOREIGN PATENT DOCUMENTS

GB          1204607          9/1970

*Primary Examiner* — Henry Y Liu

(57) ABSTRACT

A bearing greasing assembly for simultaneously greasing a plurality of bearings includes an agricultural implement which includes a frame and a plurality of rotating tilling. Each of the plurality of rotating tilling elements includes a bearing which has a grease input. A supply grease conduit is attached to the frame of the agricultural implement and the supply grease conduit has a zerk. A grease gun can be fluidly attached to the zerk to pump grease into the supply grease conduit through the zerk. The supply grease conduit branches into a plurality of outputs which is each in fluid communication with a respective one of the plurality of bearings. In this way each of the plurality of bearings can receive grease from the zerk.

6 Claims, 4 Drawing Sheets

(56) References Cited

U.S. PATENT DOCUMENTS

| | | | | |
|---|---|---|---|---|
| 3,490,561 | A * | 1/1970 | Colgan | F16N 7/32 184/6 |
| 3,981,550 | A * | 9/1976 | Zimmer | F16C 35/047 384/558 |
| 4,106,826 | A * | 8/1978 | Marola | F16C 33/6622 384/466 |
| 4,296,777 | A * | 10/1981 | Rodemer | B60R 17/02 280/421 |
| 4,586,726 | A * | 5/1986 | Capps | B62D 53/0885 280/433 |
| 4,928,794 | A * | 5/1990 | Bangerger | F16N 37/003 184/5.1 |
| 4,972,925 | A * | 11/1990 | Saretzky | F16N 25/02 184/7.4 |
| 5,285,871 | A * | 2/1994 | Sievenpiper | F16N 11/10 184/29 |
| 5,318,152 | A * | 6/1994 | Ehlert | F16N 39/002 184/104.1 |
| 5,350,040 | A * | 9/1994 | Gribble | F16N 29/00 184/105.3 |
| 5,417,308 | A * | 5/1995 | Hartl | B62D 53/0885 184/7.3 |
| 5,482,138 | A * | 1/1996 | Mori | F16N 29/02 184/6 |
| 5,718,744 | A * | 2/1998 | Ehlert | B01D 46/448 55/467 |
| RE35,842 | E * | 7/1998 | Ehlert | F16N 39/002 184/104.1 |
| 5,799,751 | A * | 9/1998 | Winkler | B23Q 11/123 184/105.3 |
| 5,955,670 | A * | 9/1999 | Goodman | G01N 29/032 73/592 |
| 6,098,754 | A * | 8/2000 | Toner | B62D 53/0885 184/14 |
| 6,122,966 | A * | 9/2000 | Goodman | F16C 33/6625 73/660 |
| 6,339,961 | B1 * | 1/2002 | Goodman | G01N 29/14 73/644 |
| 6,561,316 | B1 * | 5/2003 | Graf | F16N 29/02 184/38.4 |
| 6,619,431 | B2 * | 9/2003 | Wilcox | F16N 29/02 184/105.3 |
| 6,874,599 | B1 * | 4/2005 | Riskedal | B62D 53/0885 184/105.3 |
| 6,938,455 | B2 * | 9/2005 | Yakura | F16N 29/04 340/682 |
| 7,073,949 | B2 * | 7/2006 | Ruckle | A01B 71/04 384/489 |
| 7,168,462 | B1 * | 1/2007 | Marine | B60R 17/00 184/14 |
| 7,980,118 | B2 * | 7/2011 | He | G01N 11/08 73/54.01 |
| 8,215,455 | B1 * | 7/2012 | Hamilton | B62D 53/0885 184/29 |
| D710,169 | S * | 8/2014 | Guo | D8/14.1 |
| 8,955,544 | B2 * | 2/2015 | Gurney | F16L 37/138 285/322 |
| 9,303,814 | B2 * | 4/2016 | Ifield | F16N 7/385 |
| 10,471,825 | B2 * | 11/2019 | Roberts | F16C 35/042 |
| 10,697,585 | B1 * | 6/2020 | Porterfield | F16N 3/12 |
| 10,816,136 | B2 * | 10/2020 | Lusso | F16N 3/12 |
| 11,486,541 | B2 * | 11/2022 | Gossard | F16N 29/02 |
| 12,007,360 | B2 * | 6/2024 | Bishop | G01N 29/46 |
| 12,253,211 | B2 * | 3/2025 | Kreutzkaemper | F16N 7/385 |
| 2001/0027900 | A1 * | 10/2001 | Wilcox | F16N 29/02 184/105.3 |
| 2004/0228557 | A1 * | 11/2004 | Ruckle | A01B 71/04 384/460 |
| 2005/0175268 | A1 * | 8/2005 | Latham | F16C 33/6622 384/462 |
| 2009/0293594 | A1 * | 12/2009 | He | G01N 11/08 73/54.09 |
| 2012/0145482 | A1 * | 6/2012 | Ifield | F16N 7/385 184/6 |
| 2012/0267890 | A1 * | 10/2012 | Gurney | F16N 21/02 285/308 |
| 2013/0253855 | A1 * | 9/2013 | He | G01N 11/08 702/50 |
| 2015/0283981 | A1 * | 10/2015 | Bonner | F16C 33/6622 29/898.1 |
| 2016/0186812 | A1 * | 6/2016 | Conley | F16N 29/02 184/6.1 |
| 2016/0290848 | A1 * | 10/2016 | Conley | F16N 31/00 |
| 2017/0038003 | A1 * | 2/2017 | Conley | F16N 7/385 |
| 2017/0343157 | A1 * | 11/2017 | Gossard | F16C 33/6659 |
| 2018/0141434 | A1 * | 5/2018 | Roberts | F16C 35/06 |
| 2019/0040997 | A1 * | 2/2019 | Kreutzkaemper | H02N 2/18 |
| 2019/0120425 | A1 * | 4/2019 | Gossard | F16N 29/02 |
| 2020/0191329 | A1 * | 6/2020 | Lusso | F16K 15/1823 |
| 2022/0178109 | A1 * | 6/2022 | Miyata | E02F 9/0858 |
| 2022/0196141 | A1 * | 6/2022 | Bishop | G01N 29/032 |
| 2023/0003690 | A1 * | 1/2023 | Bishop | G01N 29/032 |

* cited by examiner

BEARING GREASING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to greasing devices and more particularly pertains to a new greasing device for simultaneously greasing a plurality of bearings. The device includes an agricultural implement that includes a plurality of bearings. The device includes a grease conduit that is attached to the agricultural implement and which is in fluid communication with each of the plurality of bearings. The device includes a zerk attached to the grease conduit which can engage a grease gun for delivering grease to all of the bearings.

(2) Description of Related Art Including Information Disclosed Under 37 CFR 1.97 and 1.98

The prior art relates to greasing devices including an automobile chassis lubrication system that includes a grease conduit that has an input and a plurality of outputs and a grease pump attached to the input for pumping grease to each of the outputs. The prior art discloses a lubrication system that employs a lubricant in mist form that is sprayed onto a friction bearing surface. The prior art discloses a lubrication manifold that has a plurality of grease inlets, a plurality of grease outlets and a plurality of valves. The prior art discloses a fifth wheel lubrication device that includes a grease manifold, a plurality of tubes extending away from the grease manifold and terminating at a strategic location on the fifth wheel. The prior art discloses a pneumatic grease system that includes a pneumatic grease pump which delivers grease to a fifth wheel of a semi tractor.

BRIEF SUMMARY OF THE INVENTION

An embodiment of the disclosure meets the needs presented above by generally comprising an agricultural implement which includes a frame and a plurality of rotating tilling. Each of the plurality of rotating tilling elements includes a bearing which has a grease input. A supply grease conduit is attached to the frame of the agricultural implement and the supply grease conduit has a zerk. A grease gun can be fluidly attached to the zerk to pump grease into the supply grease conduit through the zerk. The supply grease conduit branches into a plurality of outputs which is each in fluid communication with a respective one of the plurality of bearings. In this way each of the plurality of bearings can receive grease from the zerk.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
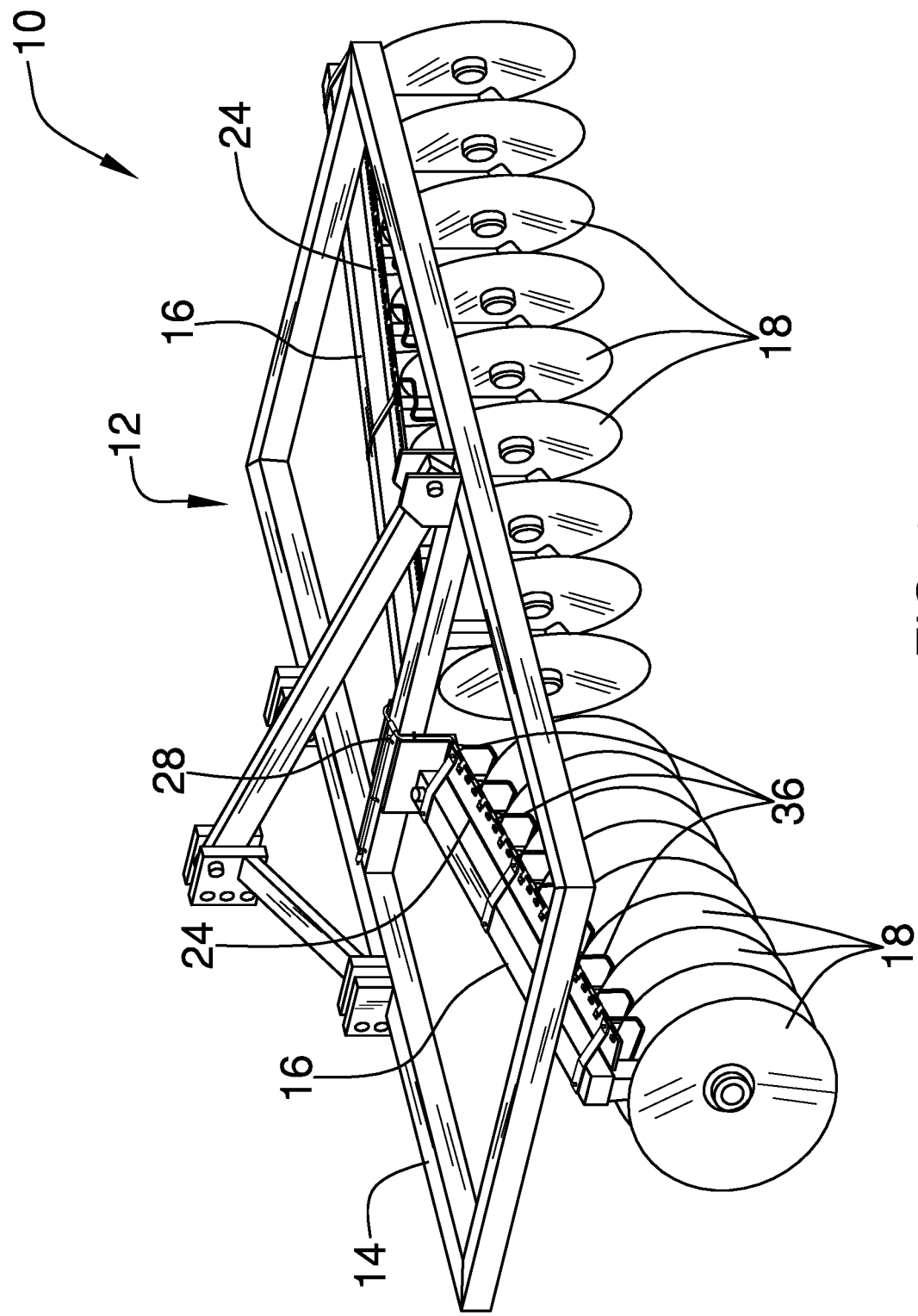
FIG. 1 is a back perspective view of a bearing greasing assembly according to an embodiment of the disclosure.
Figure 2:
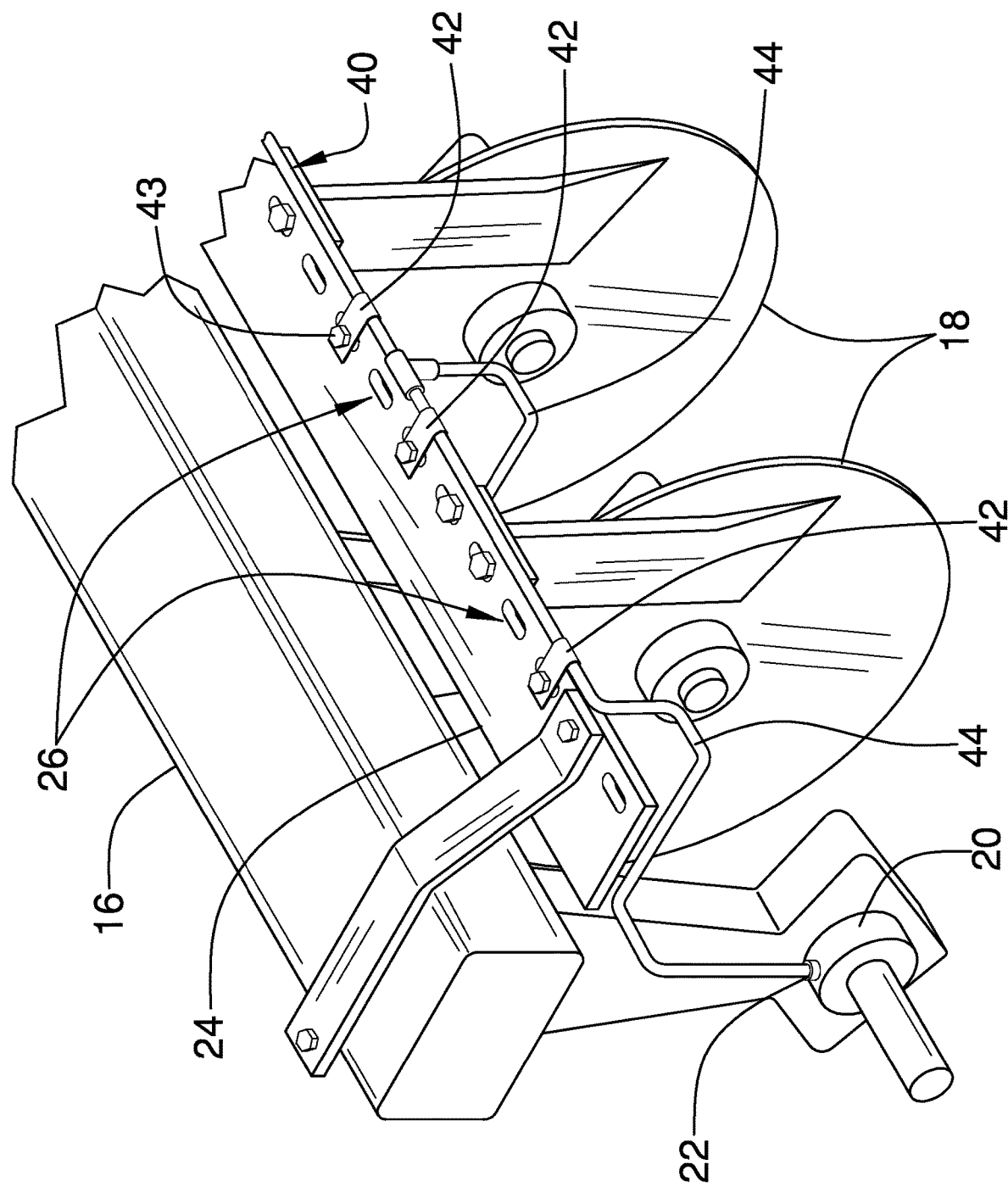
FIG. 2 is a detail view of a bearing and a plurality of rotating tilling elements of an embodiment of the disclosure.
Figure 3:
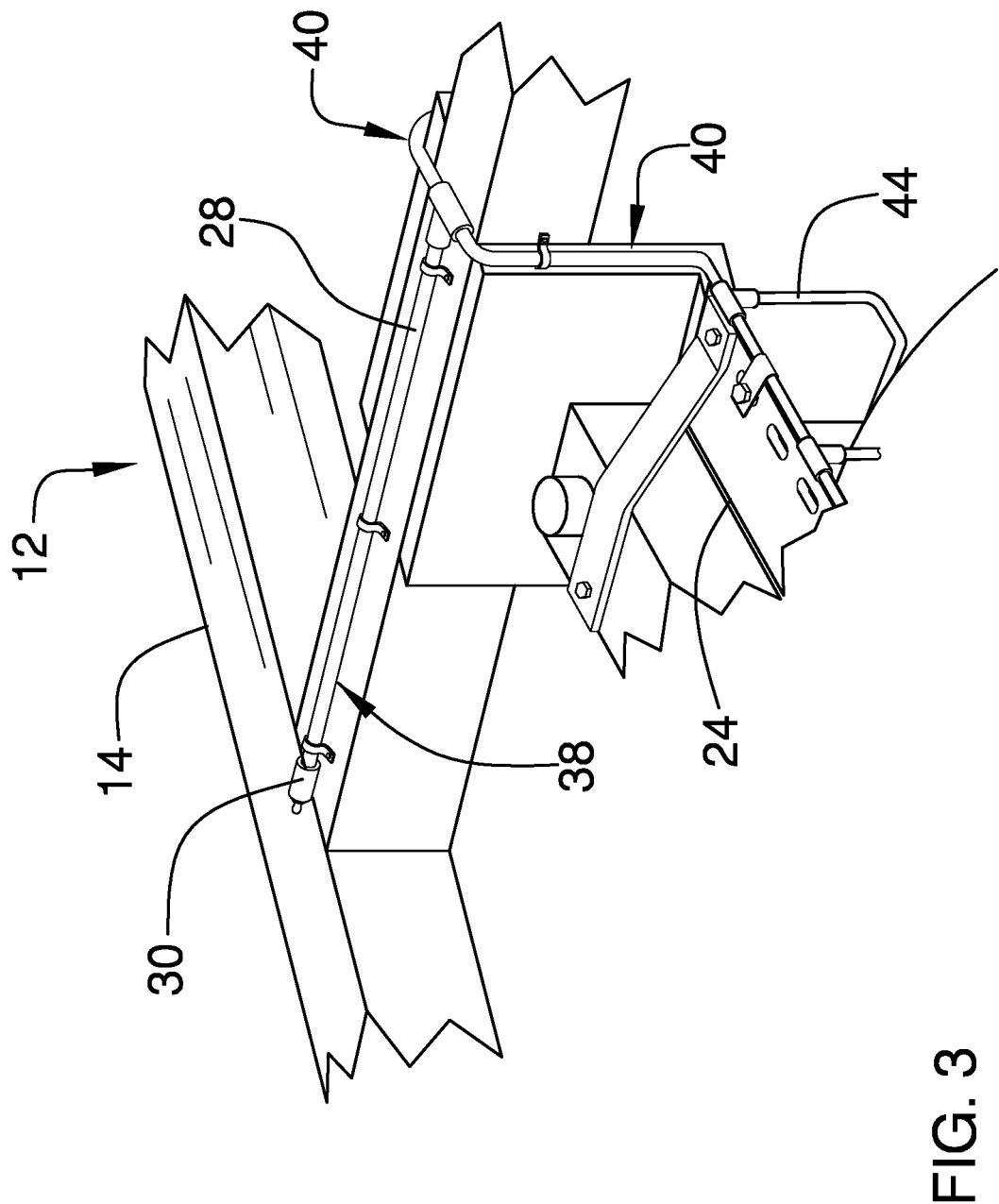
FIG. 3 is a detail view of a grease supply conduit of an embodiment of the disclosure.
Figure 4:
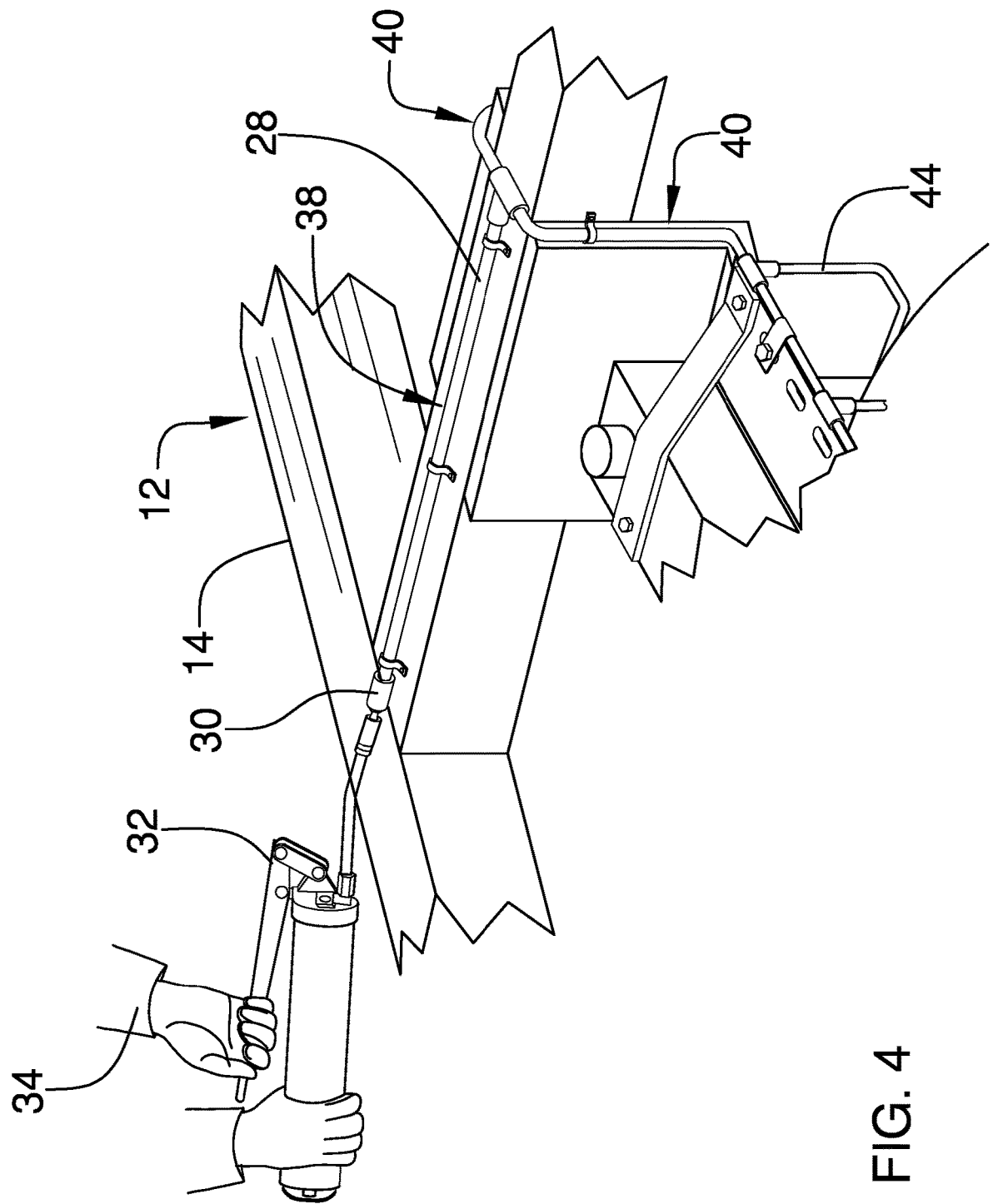
FIG. 4 is a perspective in-use view of an embodiment of the disclosure.

With reference now to the drawings, and in particular to FIGS. 1 through 4 thereof, a new greasing device embodying the principles and concepts of an embodiment of the disclosure and generally designated by the reference numeral 10 will be described.

As best illustrated in FIGS. 1 through 4, the bearing greasing assembly 10 generally comprises an agricultural implement 12 that includes a frame 14 which includes a plurality of support arms 16. Additionally, the agricultural implement 12 includes a plurality of rotating tilling elements 18 each rotatably disposed on a respective one of the plurality of support arms 16. Each of the plurality of rotating tilling elements 18 includes a bearing 20 which has a grease input 22. The agricultural implement 12 has a plurality of scraper bars 24 and each of the plurality of scraper bars 24 is attached to a respective one of the plurality of support arms 16. Each of the plurality of scraper bars 24 extends laterally above the plurality of rotating tilling elements 18 associated with the respective support arm 16. Furthermore, each of the plurality of scraper bars 24 has a plurality of holes 26 which are spaced apart from each other and are evenly distributed along the respective scraper bar 24. The agricultural implement 12 may comprise a disk harrow or other type of agricultural implement that employs rotating blades for tilling soil. Furthermore, the agricultural implement 12 may comprise a mechanized implement, such as a hay bailer for example, which has a plurality of rotating components that each has a grease zerk.

A supply grease conduit 28 is provided and the supply grease conduit 28 is attached to the frame 14 of the agricultural implement 12. The supply grease conduit 28 has a zerk 30 which is strategically positioned on the frame 14 for facilitating a grease gun 32 to be fluidly attached to the zerk 30. In this way the grease gun 32 can pump grease into the supply grease conduit 28 through the zerk 30. The zerk 30 is positioned such that an operator 34 of the agricultural implement 12 can easily access the zerk 30 from a standing position. In this way the operator 34 does not have to lie down on the ground and crawl beneath the agricultural implement 12 to access the grease zerk 30 and expose themselves to the risk of being accidentally crushed by the agricultural implement 12.

The supply grease conduit 28 branches into a plurality of outputs 36 and each of the plurality of outputs 36 is in fluid communication with a respective one of the plurality of bearings 20. In this way each of the plurality of bearings 20 can receive grease from the zerk 30. The supply grease conduit 28 has an input portion 38 and a pair of output portions 40 each branching from the input portion 38. The input portion 38 has a distal end 41 with respect to the pair of output portions 40 and the zerk 30 is fluidly disposed on the distal end 41. Furthermore, each of the pair of output portions 40 extends along a respective one of the scraper bars 24. Each of the pair of output portions 40 may be strategically routed along structural features of the agricultural implement 12 to inhibit the pair of output portions 40 from being damaged during normal operation of the agricultural implement 12.

A plurality of conduit clamps 42 is each wrapped around a respective one of the pair of output portions 40 of the supply grease conduit 28. Each of the plurality of conduit clamps 42 includes a fastener 43 which extends through a respective one of the plurality of holes 26 in a respective one of the plurality of scraper bars 24 for attaching each of the pair of output portions 40 of the supply grease conduit 28 to the respective scraper bars 24. Each of the conduit clamps 42 may comprise a hose clamp or other type of mechanical clamp that can engage the output portions 40 of the supply grease conduit 28 without crushing the output portions 40 of the supply grease conduit 28.

A plurality of output grease conduits 44 is provided and each of the plurality of output grease conduits 44 is fluidly coupled to a respective one of the pair of output portions 40 of the supply grease conduit 28. In this way each of the plurality of output grease conduits 44 can receive the grease that is pumped into the supply grease conduit 28. Each of the plurality of output grease conduits 44 defines a respective one of the outputs 36 of the supply grease conduit 28. Each of the plurality of output grease conduits 44 is fluidly coupled to the grease input 22 on a respective one of the plurality of bearings 20 associated with the plurality of rotating tilling elements 18. In this way each of the plurality of bearings 20 can receive the grease from the plurality of output grease conduits 44 for simultaneously greasing each of the plurality of bearings 20 from the zerk 30 on the supply grease conduit 28. Each of the plurality of output grease conduits 44 is strategically formed to conform to structural features of the agricultural implement 12 thereby inhibiting the plurality of output grease conduits 44 from impact damage resulting from tilling soil.

In use, the grease gun 32 is attached to the zerk 30 on the supply grease conduit 28 to pump grease into the supply grease conduit 28. Furthermore, the plurality of output grease conduits 44 delivers the grease to the plurality of bearings 20. In this way each of the plurality of bearings 20 can be simultaneously greased with the zerk 30 on the supply grease conduit 28. Furthermore, the zerk 30 is positioned such that the operator 34 can access the zerk 30 in a standing position. In this way the operator 34 can safely grease the bearings 20 without being exposed to the risk of being accidentally crushed by the agricultural implement 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bearing greasing assembly comprising:

an agricultural implement including a frame which includes a plurality of support arms, said agricultural implement including a plurality of rotating tilling elements each being rotatably disposed on a respective one of said plurality of support arms, each of said plurality of rotating tilling elements including a bearing which has a grease input;

a supply grease conduit being attached to said frame of said agricultural implement, said supply grease conduit having a zerk being strategically positioned on said frame for facilitating a grease gun to be fluidly attached to said zerk to pump grease into said supply grease conduit through said zerk, said supply grease conduit branching into a plurality of outputs, each of said plurality of outputs being in fluid communication with a respective one of said plurality of bearings thereby facilitating each of said plurality of bearings to receive grease from said zerk;

wherein said agricultural implement has a plurality of scraper bars being attached to a respective one of said plurality of support arms, each of said plurality of scraper bars extending laterally above said plurality of rotating tilling elements associated with said respective support arm, each of said plurality of scraper bars having a plurality of holes extending through each of a respective scraper bar, said plurality of holes being spaced apart from each other and being evenly distributed along said respective scraper bar wherein said supply grease conduit has an input portion and a pair of a output portions branching from said input portion, said input portion having a distal end with respect to said pair of output portions, said zerk being fluidly disposed on said distal end, each of said output portions extending along a respective one of said scraper bars.

2. The assembly according to claim 1, further comprising a plurality of conduit clamps, each of said conduit clamps being wrapped around a respective one of said pair of output portions of said supply grease conduit, each of said plurality of conduit clamps including a fastener which extends through a respective one of said plurality of holes in a respective one of said plurality of scraper bars for attaching each of said pair of output portions of said supply grease conduit to said respective scraper bars.

3. The assembly according to claim 1, further comprising a plurality of output grease conduits, each of said plurality of output grease conduits being fluidly coupled to said supply grease conduit thereby facilitating each of said plurality of output grease conduits to receive the grease that is pumped into said supply grease conduit, each of said plurality of output grease conduits defining a respective one of said outputs of said supply grease conduit.

4. The assembly according to claim 3, wherein each of said plurality of output grease conduits is fluidly coupled to said grease input of a respective one of said plurality of bearings associated with said plurality of rotating tilling elements thereby facilitating each of said plurality of bearings to receive the grease from said plurality of output grease conduits for simultaneously greasing each of said plurality of bearings from said zerk on said supply grease conduit.

5. The assembly according to claim 3, wherein each of said plurality of output grease conduits is strategically formed to conform to structural features of said agricultural implement thereby inhibiting said plurality of output grease conduits from being damaged by impact resulting from tilling soil.

6. A bearing greasing assembly comprising:
an agricultural implement including a frame which includes a plurality of support arms, said agricultural implement including a plurality of rotating tilling elements each being rotatably disposed on a respective one of said plurality of support arms, each of said plurality of rotating tilling elements including a bearing which has a grease input, said agricultural implement having a plurality of scraper bars being attached to a respective one of said plurality of support arms, each of said plurality of scraper bars extending laterally above said plurality of rotating tilling elements associated with said respective support arm, each of said plurality of scraper bars having a plurality of holes extending through each of a respective scraper bar, said plurality of holes being spaced apart from each other and being evenly distributed along said respective scraper bar;

a supply grease conduit being attached to said frame of said agricultural implement, said supply grease conduit having a zerk being strategically positioned on said frame for facilitating a grease gun to be fluidly attached to said zerk to pump grease into said supply grease conduit through said zerk, said supply grease conduit branching into a plurality of outputs, each of said plurality of outputs being in fluid communication with a respective one of said plurality of bearings thereby facilitating each of said plurality of bearings to receive grease from said zerk, said supply grease conduit having an input portion and a pair of a output portions branching from said input portion, said input portion having a distal end with respect to said pair of output portions, said zerk being fluidly disposed on said distal end, each of said output portions extending along a respective one of said scraper bars;

a plurality of conduit clamps, each of said conduit clamps being wrapped around a respective one of said pair of output portions of said supply grease conduit, each of said plurality of conduit clamps including a fastener which extends through a respective one of said plurality of holes in a respective one of said plurality of scraper bars for attaching each of said pair of output portions of said supply grease conduit to said respective scraper bars; and a plurality of output grease conduits, each of said plurality of output grease conduits being fluidly coupled to a respective one of said pair of output portions of said supple grease conduit thereby facilitating each of said plurality of output grease conduits to receive the grease that is pumped into said supply grease conduit, each of said plurality of output grease conduits defining a respective one of said outputs of said supply grease conduit, each of said plurality of output grease conduits being fluidly coupled to said grease input of a respective one of said plurality of bearings associated with said plurality of rotating tilling elements thereby facilitating each of said plurality of bearings to receive the grease from said plurality of output grease conduits for simultaneously greasing each of said plurality of bearings from said zerk on said supply grease conduit, each of said plurality of output grease conduits being strategically formed to conform to structural features of said agricultural implement thereby inhibiting said plurality of output grease conduits from being damaged by impact resulting from tilling soil.

* * * * *